Patented May 8, 1928.

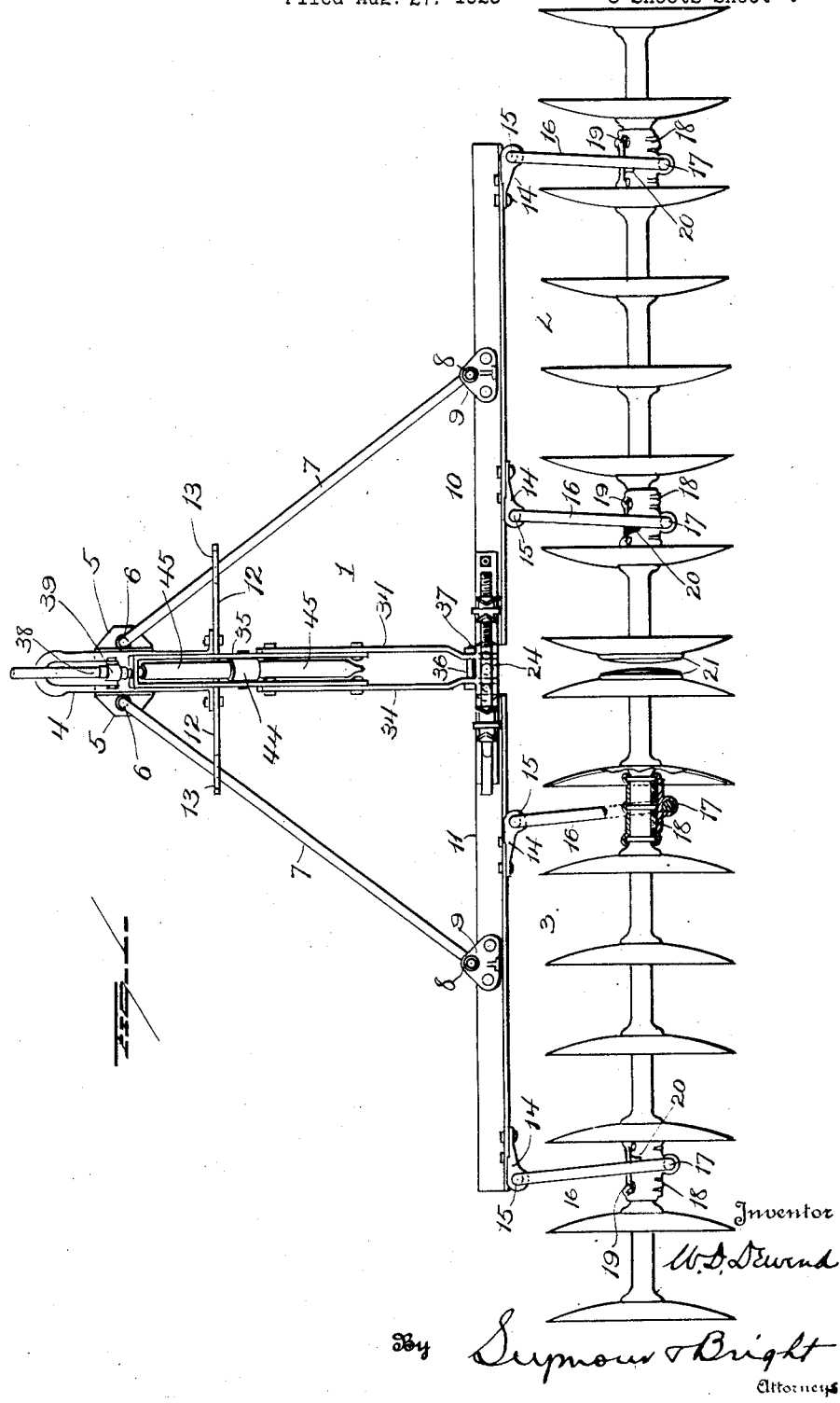

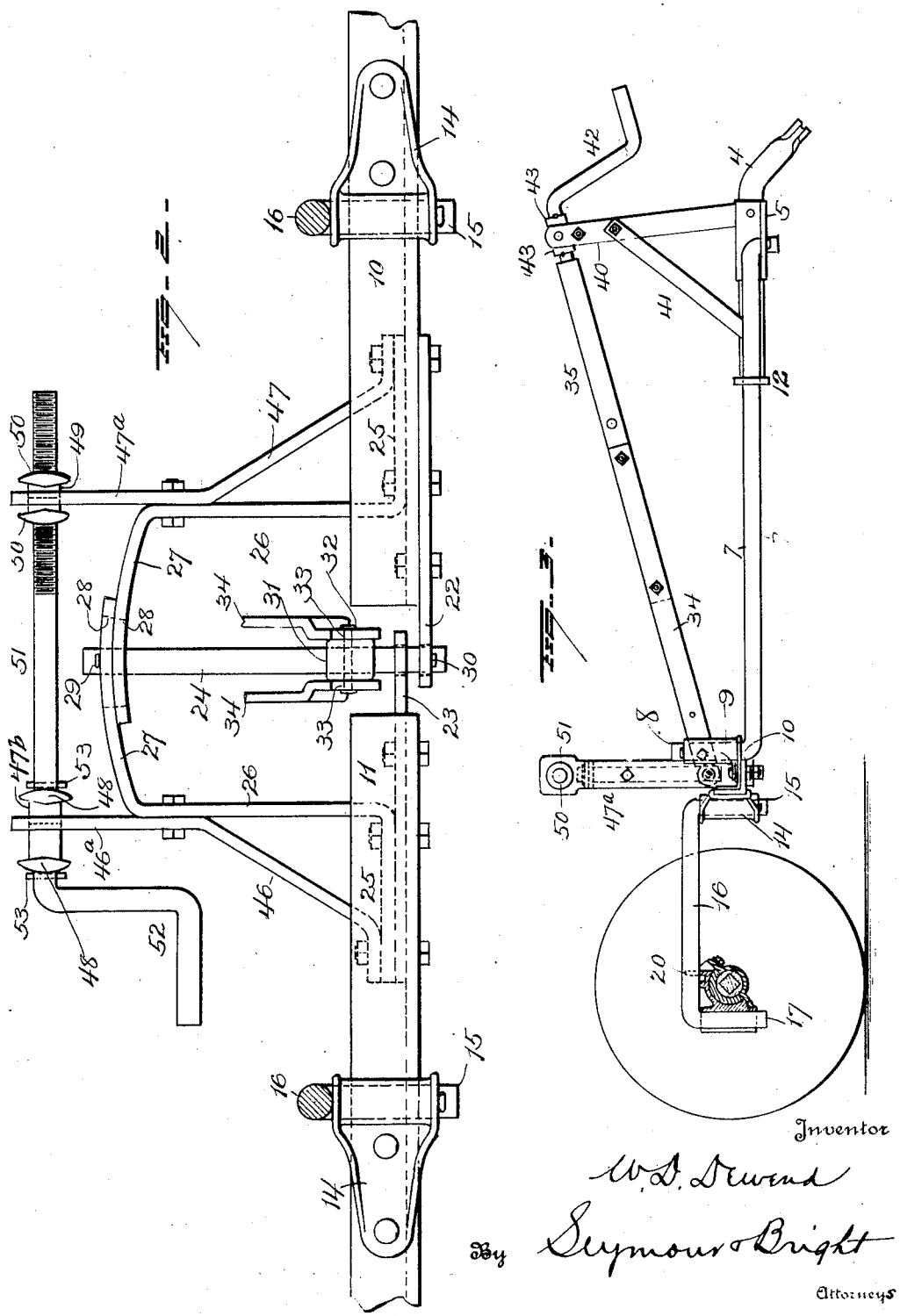

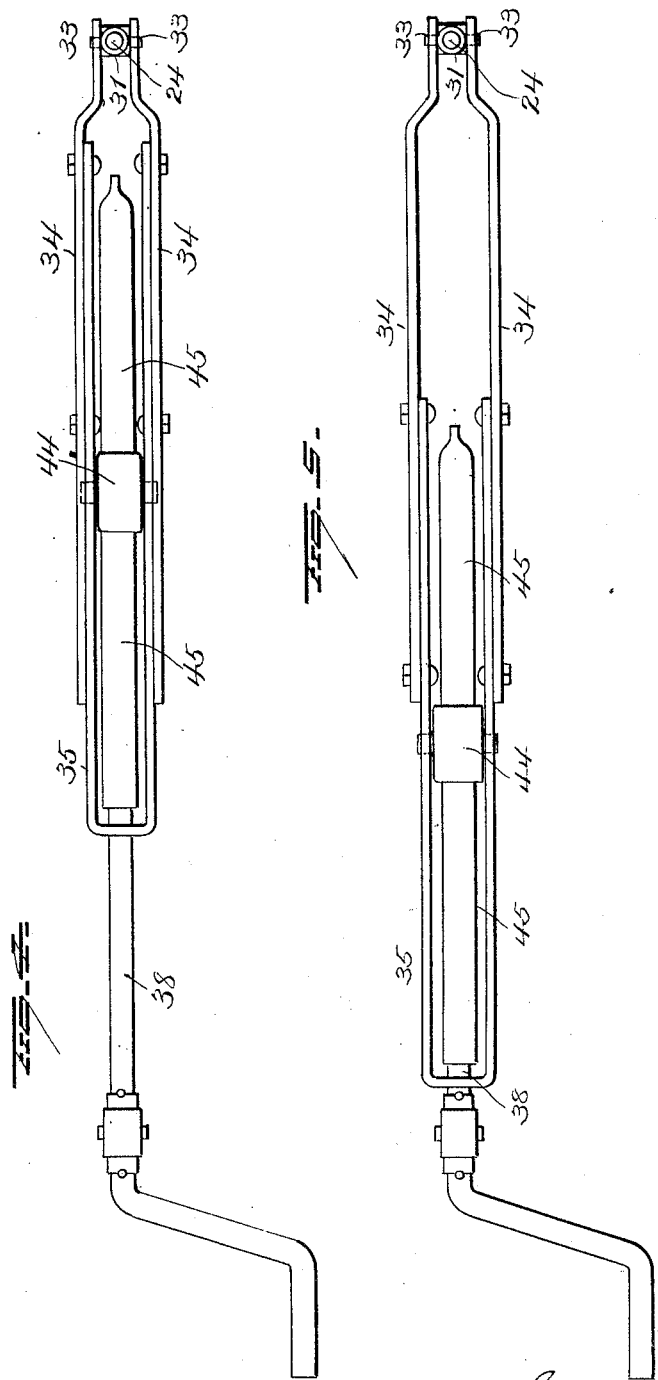

1,669,080

UNITED STATES PATENT OFFICE.

WILLIAM D. DEWEND, OF SOUTH BEND, INDIANA, ASSIGNOR TO OLIVER CHILLED PLOW WORKS, OF SOUTH BEND, INDIANA.

HARROW.

Application filed August 27, 1925. Serial No. 52,880.

This invention relates to improvements in harrows and more particularly to those of the multiple disk gang type,—one object of the invention being to provide such a harrow which shall be well adapted for use in orchards and to embody in the construction, efficient means for angling the disk gangs; means to effect the leveling of the gangs, and means to limit the lateral swinging of the gang draw bars.

With this and other objects in view, the invention consists in certain novel features of construction and combinations of parts as hereinafter set forth and pointed out in the claims.

In the accompanying drawings;

Figure 1 is a plan view of a multiple gang disk harrow showing an embodiment of my invention;

Figure 2 is a rear end view partly broken away and partly in section;

Figure 3 is a view partly in elevation and partly in section, and

Figures 4 and 5 are plan views illustrating the angling means.

The harrow comprises a frame unit 1 and two disk gang units 2, 3. The frame unit includes a draft yoke 4 to which laterally projecting brackets 5, 5 are secured. These brackets provide bearings for vertical pivots 6 at the forward ends of draft bars 7, which latter diverge from their pivotal connection with the brackets 5 and are pivotally connected at their rear ends by means of upwardly projecting vertical pintles 8, with brackets 9 rigidly secured to transversely disposed angle bars 10, 11, these transverse or cross bars constituting control bars for the disk gang units. In order that the draft yoke 4 and divergent draft bars 7 shall be maintained in proper horizontal alinement, a cross bar 12 is rigidly secured to the rear portion of the draft yoke and this cross bar is provided with elongated openings 13 for the passage of the draft bars 7.

Brackets 14 are secured to the control bars 10 and 11 and are suitably spaced to receive vertical pintles 15 on draw bars 16 for the disk gangs. These draw bars thus pivotally connected at their forward ends with the transverse bars 10, 11, are pivotally connected at their rear ends, by vertical pintles 17 with bearing boxes 18 of the disk gangs. From this construction it will be apparent that the gang draw bars are capable of lateral swinging movement. Such swinging movement will be limited in one direction by stops 19 and in the other direction by stops 20, on the bearing boxes 18 of the disk gangs. When the disk gangs are set as an outthrow harrow (as shown in Figure 1) and are moved from a transverse alinement to a rearwardly diverging angle, the ability of the gang draw bars to swing laterally permits the side draft of the gangs to force the bumpers 21 of the disk gangs together, and the stop lugs 19 limit this swing and hold the gangs in central alinement with the frame 1. When the gangs are set as an outthrow harrow, the side draft of the gangs has an influence on the gang draw bars to cause them to swing inwardly, which is limited by the stop lugs 20.

Straps or arms 22, 23 are rigidly secured to the transverse bars 10, 11 of the frame unit 1 and project inwardly from said bars,—the inwardly projecting portions of said straps or arms being disposed one above the other and provided with aligned openings which loosely receive a vertical coupling pin 24 located in line with the longitudinal axis of the frame unit 1. The base portions 25 of standards 26 are rigidly secured to the transverse bars 10, 11, and said standards are provided with inwardly projecting arcuate arms 27, one of which overlies the other and these standard arms are provided with elongated openings or slots 28, through which the upper end portion of the coupling pin 24 projects. A key 29 may be passed through the upper end portion of the coupling pin to prevent descent of the same and a similar key 30 may be passed through said coupling pin under the strap or arm 22.

A sleeve 31 is mounted on an intermediate portion of the coupling pin and held in place by rivet 32, and said sleeve is provided at diametrically opposite sides with trunnions 33 for connection of gang angling mechanism. This mechanism includes parallel bars 34, 34 secured to and constituting extensions of the parallel arms of an approximately U-shaped yoke or member 35. The rear ends of the extension bars 34 (which may be brought closer together than the main portions of said bars) are spaced apart by a sleeve 36 disposed between said bars and supported by a bolt 37, and the rear end portions of said extension bars are mounted on the trunnions 33 on the sleeve 31. The U-shaped member 35 is slidingly mounted on a screw shaft 38. This shaft passes freely through a sleeve 39 which is pivotally supported between standards 40 located at or near the forward end of the frame unit 1 and sustained by braces 41. The shaft 38 is provided at its forward end with a hand crank 42 and is prevented from longitudinal movement by collars 43, 43 on said shaft at respective ends of the sleeve 39. The threaded portion of the screw shaft 38 enters an internally threaded sleeve 44 pivotally supported between the parallel members of the U-shaped yoke or member 35, and to respective ends of the sleeve 44, protecting and lubricant tubes 45 may be secured.

It will be seen that when the shaft 38 is turned, motion will be imparted through the internally threaded tube 44 to the U-shaped member 35 and the extension bars 34 to move the same longitudinally. The extension bars being connected with the coupling pin 24 and the latter being connected through the medium of the straps or arms 22—23 with the transverse bars 10, 11, said bars will be turned on their pivotal connections with the draft bars 7, and the disk gangs may be moved to or from angling positions when the screw shaft is turned. When the harrow is set for outthrow, as shown in Figure 1, the inner ends of the disk gangs will be moved rearwardly and caused to assume working positions, when the screw shaft 38 is turned. The positions of parts of the gang angling devices, when the gangs have been thus adjusted are shown in Figure 4. When the harrow is set for inthrow, the positions of the gang control bars 10, 11 should be reversed. By setting the sleeve 44 to the rear portion of the shaft 38, and securing the extension bars 34 to the members 35, as shown in Figure 5, it is possible to move the coupling pin forwardly and with it the inner ends of the contact bars 10 and 11 to assume forwardly diverging angles.

The gang control bars 10 and 11 are held in a horizontal plane or may be set at a limited angle in either direction from that plane by means of leveling devices now to be described.

Uprights 46—47 are secured to the control bars 10 and 11 and to the standards 26, (diagonal portions of said uprights serving as braces for said standards) and the upper parallel portions 46$^a$—47$^a$ of said uprights extend above the standards. Mounted in a hole in the portion 46$^a$ of upright 46 is a two part sleeve 47$^b$ having retaining flanges 48, said hole being angular in form and the sleeve members angular exteriorly so that the latter will be prevented from turning. A two-part sleeve 49 having flanges 50 is similarly mounted in the upper portion 47$^a$ of the upright 47, and said two-part sleeve 49 is internally threaded. A screw shaft 51, having hand crank 52 at one end is freely mounted and prevented from longitudinal movement relatively to said sleeve 47$^b$ by keys 53,—the threaded portion of said shaft passing through the internally threaded two-part sleeve 49. As the screw shaft 51 is rotated, the sleeves 47$^b$ and 49 will be so moved that flanges 48—50, at one end of each of the respective two-part sleeves will engage the portions 46$^a$ and 47$^a$ of the respective uprights 46 and 47 and thus cause the control bars 10 and 11 and hence the disk gangs to be tilted,—the tilting movement being limited by the slots in the arcuate portions 27 of the standards 26, through which slots, the coupling pin 24 passes as previously stated. It will be understood that when the screw shaft is turned, said shaft will move longitudinally through the threaded two-part sleeve 49 until one of the flanges 48 on the sleeve 47$^b$ engages the adjacent upright member 46$^a$ and further turning of said shaft will cause the two part sleeve 49 to move longitudinally until one of its flanges 50 engages the adjacent upright member 47$^a$. Further turning of the screw shaft 51 will then effect the tilting of the disk gangs to cause proper leveling of the same with respect to the ground. It will be noted upon reference to Figs. 1 and 2 that the flanges 48 and 50 are properly shaped to accommodate the varying angular relation between the standards and the shaft as the gangs are adjusted in any direction.

Various changes might be made in the details of construction of my invention without departing from the spirit of the same or limiting its scope and hence I do not restrict myself to the precise details herein set forth.

Having fully described my invention what I claim as new and desire to secure by Letters-Patent, is:—

1. In a disk harrow, the combination of a frame unit, two disk gang units, said frame unit comprising a forward draft member, draft bars connected with said draft member by vertical pivots and diverging rearwardly whereby they may swing in a horizontal plane to cause their rear ends to approach or recede, transverse bars connected by vertical pivots with the rear ends of the divergent draft bars respectively, means connecting the disk gang units with the respective transverse bars, means for connecting the inner ends of said transverse bars including a vertically disposed coupling pin, and means extending longitudinally of frame unit and pivotally connected with said pin for shifting the pin longitudinally of the frame unit and angling the transverse bars and disk gang units.

2. In a disk harrow, the combination of a frame unit, two disk gang units, said frame unit comprising draft bars diverging rearwardly and mounted to permit their rear ends to approach or recede, transverse bars connected by vertical pivots with the rear ends of the divergent draft bars respectively, means connecting the disk gang units with the transverse bars respectively, means connecting the inner ends of said transverse bars including a central vertically disposed pin, a screw shaft having a swivel mounting at the forward portion of the frame unit, a yoke movable along said shaft and connected to said vertical pin, an interiorly threaded sleeve through which said screw shaft passes, and means pivotally supporting said sleeve in said yoke, whereby when the shaft is rotated the pin will be moved longitudinally of the frame unit to angle the transverse bars and the gang units.

3. In a disk harrow, the combination of a frame unit, two disk gang units, said frame unit comprising a forward draft member, draft bars connected with said draft member by vertical pivots and diverging rearwardly, a cross bar secured to said forward draft member and having openings through which the divergent draft bars pass to be supported and rear transverse bars connected by vertical pivots with the rear ends of the divergent draft bars, means connecting the disk gang units with said rear transverse bars respectively, angling means mounted on the frame unit, and means connecting said angling means with the inner ends of both rear transverse bars.

4. In a disk harrow, the combination of a frame unit, two disk units, said frame unit comprising draft bars diverging rearwardly and mounted to permit their rear ends to approach or recede and transverse bars connected by vertical pivots with the rear ends of the diverging draft bars respectively, means connecting the disk gang units to the transverse bars respectively, a manually operable screw shaft, a pivoted mounting for said shaft, a yoke slidingly mounted at one end on said shaft, an interiorly threaded sleeve supported between the side members of said yoke and through which sleeve the screw shaft passes, extension bars secured to said members of the yoke, and connections between the rear ends of said extension bars and the inner ends of the transverse bars.

5. In a disk harrow, the combination of a frame unit, two disk units, said frame unit comprising rearwardly diverging draft bars mounted to permit their rear ends to approach or recede and transverse bars connected by vertical pivots with the rear ends of the diverging draft bars respectively, means connecting the disk gang units to the transverse bars respectively, a manually operable screw shaft, a pivoted mounting for the front end of said shaft, a yoke slidingly mounted at one end on said shaft, an interiorly threaded sleeve supported between the side members of said yoke and through which sleeve the screw shaft passes, extension bars secured to said members of the yoke, inwardly projecting parts on said transverse bars and disposed one above the other, a vertically disposed coupling pin passing loosely through alined openings in said inwardly projecting parts, means for supporting the upper portion of said pin, and means to pivotally connect said coupling pin with said extension bars.

6. In a disk harrow, the combination of a frame unit, two disk units, said frame unit comprising a forward draft member, draft bars connected with said draft member by vertical pivots and diverging and transverse bars connected by vertical pivots with the rear ends of the diverging draft bars respectively, means connecting the disk gang units to the transverse bars respectively, inwardly projecting parts on said transverse bars and disposed one above the other, a vertically disposed coupling pin passing loosely through alined openings in said inwardly projecting parts, standards secured to the transverse bars and having inwardly projecting arms provided with openings through which the upper portion of the coupling pin passes, means to prevent vertical displacement of the pin and means mounted on the frame unit to move the pin longitudinally thereof and angle the transverse bars and disk units.

7. In a disk harrow, the combination of a frame unit including loosely mounted transverse bars, a disk gang unit connected with each of said transverse bars, uprights secured to said transverse bars, a sleeve mounted in each upright, and a manually operable shaft passing through said sleeves and having threaded connection with one of them.

8. In a disk harrow, the combination of a frame unit including loosely mounted transverse bars, a disk gang unit connected with each of said transverse bars, uprights secured to said transverse bars, a sleeve mounted in each upright, a manually operable shaft passing through said sleeve and having threaded connection with one of them, each of said sleeves having flanges at its ends normally spaced from the uprights.

9. In a disk harrow, the combination of a frame unit including two loosely mounted transverse bars, a disk gang unit connected with each of said bars, means carried by and bridging adjacent inner ends of the bars for tilting said bars to tilt the disk gang units, and means for limiting such tilting movement.

10. In a disk harrow, the combination of a frame unit including loosely mounted transverse bars, a disk gang unit connected with each of said transverse bars, a vertical coupling pin connecting said bars, means for tilting said bars to tilt the disk gangs, uprights secured to said bars, said uprights having inwardly projecting overlapping arms having elongated openings through which the coupling passes, said openings serving to limit the extent of tilting of the transverse bars and disks gang units.

11. In a disk harrow, the combination of a frame unit including two loosely mounted transverse bars, a disk gang unit connected with each of said transverse bars, uprights secured to said transverse bars, non-revoluble two-part sleeve mounted to slide on said uprights, each part of each sleeve having a flange at one end, and one of said sleeves being internally threaded, a manually operable shaft mounted freely in one of said sleeves, and means to prevent movement of this sleeve relatively to the shaft, said shaft being threaded through the other sleeve.

12. In a disk harrow, the combination of a frame unit including two loosely mounted transverse bars, a disk gang unit connected with each of said bars, a coupling pin connecting said bars, standards secured to said bars and having inwardly projecting arms provided with openings through which the coupling pin passes, uprights secured to the transverse bars and to the standards and projecting above the latter, and means carried by said uprights and cooperable therewith to tilt the transverse bars and the disk gangs connected therewith.

In testimony whereof, I have signed this specification.

WILLIAM D. DEWEND.